July 19, 1927.
F. H. WALTER
PISTON RING
Filed Aug. 16, 1923
1,636,027
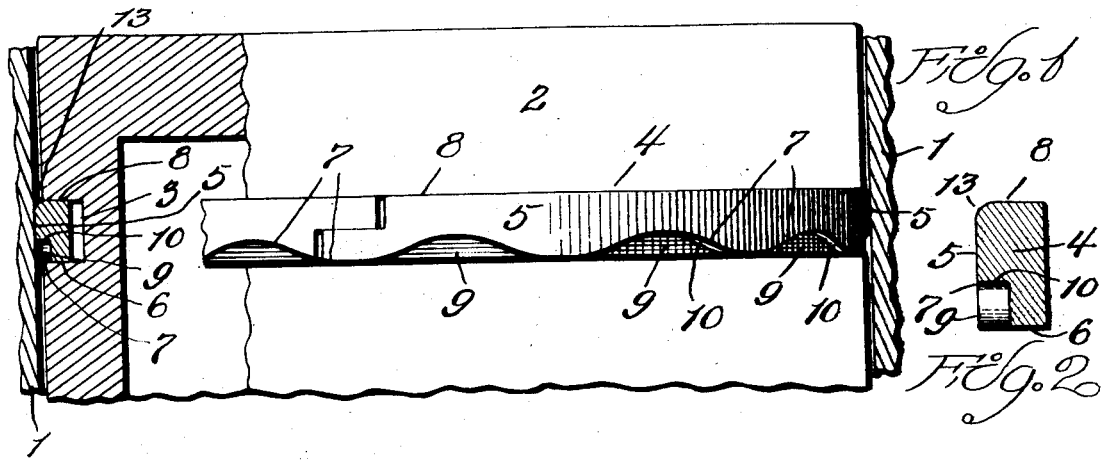
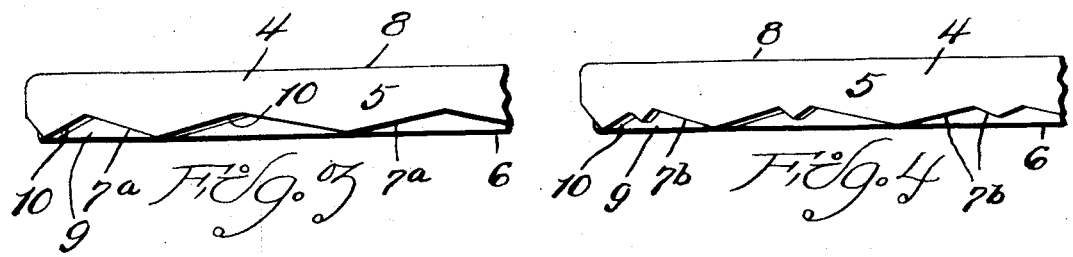
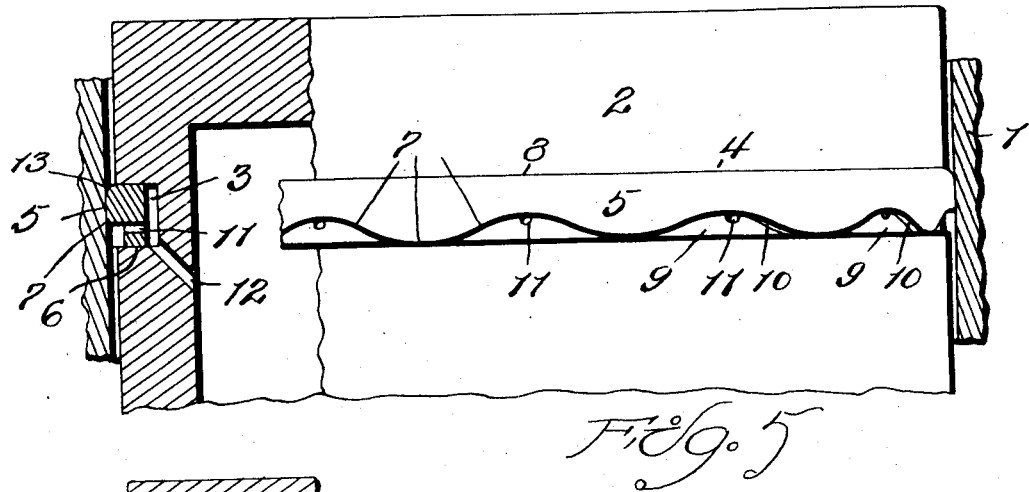
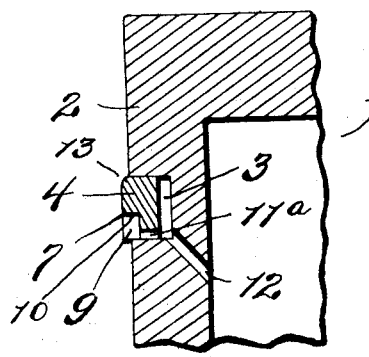
INVENTOR
FRANK H. WALTER,
by Ralph Kalish ATTORNEY.

Patented July 19, 1927.

1,636,027

UNITED STATES PATENT OFFICE.

FRANK H. WALTER, OF ST. LOUIS, MISSOURI, ASSIGNOR TO UNICO MOTOR PRODUCTS CORPORATION, OF ST. LOUIS, MISSOURI, A CORPORATION OF MISSOURI.

PISTON RING.

Application filed August 16, 1923. Serial No. 657,734.

This invention relates to a certain new and useful improvement in piston or packing rings of the type especially adapted for use in internal combustion engines.

In internal combustion engines having a splash system of lubrication, such as are to-day generally employed in automobiles and the like, lubricant is distributed at timed intervals in more or less excessive quantities varying in volume upon the cylinder walls, and it is hence essential that means be provided to prevent any excess lubricant working up the cylinder walls into the explosion-chambers of the engine, the presence of lubricating oil in the explosion-chambers, as is well known, more or less detrimentally in various ways affecting the efficiency of the engine.

My present invention has for its chief object the provision of means in the form of a piston or packing ring so constructed as to most efficiently function not only in forming a fluid-tight joint between the piston and the cylinder, but also in removing from the cylinder-wall and directing back into the crank-case of the engine any excess lubricant.

With the above and other objects in view, my present invention resides in the novel features of form, construction, arrangement, and combination of parts hereinafter described and afterwards pointed out in the claim.

In the accompanying drawings,

Figure 1 illustrates fragmentally a cylinder, movable in which is a piston equipped with a ring embodying my invention, both piston and ring being shown partly in elevation and partly in section;

Figure 2 is an enlarged transverse sectional view of the ring;

Figures 3 and 4 are fragmental elevational views of slightly modified forms of the ring;

Figure 5 is a view similar to Figure 1, showing the ring also formed with discharge drains for the lubricant-basins or pockets; and Figure 6 is a fragmental sectional view of a piston and ring, showing a slightly modified form of lubricant discharge-drain.

Referring now more in detail and by reference characters to the accompanying drawing, 1 indicates a cylinder, fitting for reciprocation in which is a piston 2 having a ring-groove 3, said parts being of any standard or approved form.

Disposed around the piston 2 and in the groove 3, is a ring 4 of my invention. This ring 4 is preferably of substantially rectangular section, as best seen in Figure 2, and of the split resilient type with preferably a step-joint to bear expansively, as is common, at its outer peripheral face 5 upon the inner wall of cylinder 1 to form a fluid-tight joint in the reciprocations of the piston between the piston and the wall of the cylinder.

Adjacent the lower axial end face 6 of the ring, the outer peripheral face 5 is cut away or recessed inwardly, and the ring 4 thereby formed or provided with a lower peripheral edge 7 in the plane of the cylinder engaging and joint-forming face 5. This edge 7 is preferably of a regular wavy shape circumferentially of the ring at and adjacent its end face 6, as best seen in Figures 1 and 5, the edge as a whole preferably comprising a circumferential connected series of curved sections or lines. Such edge, however, may, as an alternate or modified form, comprise a circumferential connected series of straight sections or lines, each section or line being disposed at an angle to its immediately contiguous sections or lines, and the several sections or lines being either of substantially uniform, regular length, as, for instance, the sections or lines forming the edge 7ª of Figure 3, or of non-uniform, irregular length, as, for instance, the sections or lines forming the edge 7ᵇ of Figure 4. In each instance, however, such peripheral edge 7, 7ª, or 7ᵇ may well be described as sinuous in shape throughout circumferentially of the ring and hence as being disposed at an angle obliquely both to the lower and upper end faces 6 and 8, respectively, of the ring and to the normal longitudinal path of movement of the piston 2 in its reciprocations within the cylinder 1. In such formation of the edge 7 and its modifications 7ª and 7ᵇ, there results upon the periphery of the ring a series of cavities or recesses opening throughout their area both to the outer peripheral face 5 and to the lower end face 6 of the ring, the upper wall 10 thereof, which is preferably at right angles, as shown, to said peripheral face 5, terminating upon the peripheral face 5 of the ring in the edge 7, 7ª, or 7ᵇ, as the case may be, and the inner or rear wall of which recesses is preferably also approximately at right angles to said lower end face 6.

I am aware that a piston-ring provided or formed with a so-called lubricant scraping edge is common today, but so far as I am aware the scraping edge of all such rings is substantially parallel circumferentially with the opposite end faces of the ring and at right angles to the normal path of piston travel. By virtue, however, of the peculiar form of the scraping edge 7 and its modifications 7ª and 7ᵇ and of the fact that it is both non-parallel with the end-faces of the ring and oblique to the normal path of movement or travel of the piston, the ring 1 effects at its said edge and on each down-stroke of the piston what I might describe as a shearing cut upon the lubricant disposed upon the wall of the cylinder, positively breaking up, cutting, or minutely dividing the lubricant globules, and thus functions most efficiently to remove from the cylinder wall any excess lubricant which may have been deposited on the cylinder-wall on the up-stroke of the piston, such excess lubricant being carried down with the piston in the cavities or recesses 9 and emptying or discharging then directly into the crank-case or flowing from the cavities or recesses 9 into the piston and then into the crank-case through the transverse ring ducts 11 and communicating piston-drains 12 provided for the purpose, as best seen in Figure 5. Preferably the ducts 11 are disposed through the ring adjacent the recess-wall 10 and at the highest point of each recess or cavity, as illustrated in Figure 5; however, such ducts may, if desired, be in the form of notches 11ª disposed transversely upon the end face 6 of the ring at each of said cavities or recesses.

I might add that the normal efficiency of the ring in so, as described, effecting a shearing removal cut upon the filament of lubricant upon the cylinder wall is augmented both by any slippage or bodily turning of the ring 4 in its groove 3 resulting either from a faulty seating in its groove or from a torque in the piston-rod.

I might add further that preferably the upper end face 8 and the peripheral face 5 of the ring are connected by a rounded or beveled corner 13 to obviate the carrying up of lubricant by the ring on the upstroke of the piston.

It is to be understood that minor changes in the form and construction of the ring may be made and substituted for those herein shown and described without departing from the nature and principle of my invention.

Having thus described my invention, what I claim and desire to secure by Letters Patent is:

A split resilient piston-ring having an outer peripheral cylinder-wall engaging face and formed at its lower axial end with a circumferential series of contiguous outer peripheral recesses opening both to said peripheral face and to the lower end face of the ring, the upper wall of said series of recesses terminating in approximately the plane of said peripheral face in a circumferentially continuous cylinder-wall scraping edge sinuous in shape circumferentially of the ring disposed obliquely to the line of normal piston travel, portions of said scraping edge being coincident with and. in the plane of the lower end face of the ring and the ring being transversely provided at said recesses with ducts opening both to said recesses and to the inner peripheral face of the ring.

In testimony whereof, I have signed my name to this specification.

FRANK H. WALTER.